(12) United States Patent
Sun et al.

(10) Patent No.: US 12,405,458 B2
(45) Date of Patent: Sep. 2, 2025

(54) OPEN TYPE FINE-TUNING SIGHT

(71) Applicant: Huanic Corporation, Shaanxi (CN)

(72) Inventors: Jianhua Sun, Shaanxi (CN); Meng Zhao, Shaanxi (CN)

(73) Assignee: Huanic Corporation, Shaanxi (CN)

( * ) Notice: Subject to any disclaimer, the term of this patent is extended or adjusted under 35 U.S.C. 154(b) by 278 days.

(21) Appl. No.: 17/768,203

(22) PCT Filed: Dec. 31, 2019

(86) PCT No.: PCT/CN2019/130841
§ 371 (c)(1),
(2) Date: Apr. 11, 2022

(87) PCT Pub. No.: WO2021/134629
PCT Pub. Date: Jul. 8, 2021

(65) Prior Publication Data
US 2024/0094520 A1    Mar. 21, 2024

(51) Int. Cl.
*G02B 21/16*    (2006.01)
*F41G 1/30*    (2006.01)
(Continued)

(52) U.S. Cl.
CPC ............ *G02B 23/16* (2013.01); *F41G 1/30* (2013.01); *G02B 7/023* (2013.01)

(58) Field of Classification Search
CPC ............ G02B 23/16; G02B 7/023; F41G 1/30
See application file for complete search history.

(56) References Cited

U.S. PATENT DOCUMENTS

D778,390 S * 2/2017 Zhang .......................... D22/109
9,625,235 B2 * 4/2017 DeLaca ..................... F41G 1/38
(Continued)

FOREIGN PATENT DOCUMENTS

CN    204268972 U    4/2015
CN    106440939 A    2/2017
(Continued)

OTHER PUBLICATIONS

Japanese Notice of Reasons for Refusal dated Oct. 11, 2022, in connection with Japanese Application No. 2021-578009.
(Continued)

*Primary Examiner* — Wyatt A Stoffa
*Assistant Examiner* — John Curtis Sipes
(74) *Attorney, Agent, or Firm* — Wolf, Greenfield & Sacks, P.C.

(57) ABSTRACT

An open type fine-tuning sight, including a housing mainly provided with a straight portion and a lens mounting frame, and the housing includes an outer housing assembly and an inner housing assembly; the inner housing assembly is sleeved in an installation space of the outer housing assembly, and a front end of the inner housing assembly is connected to the front end of the outer housing assembly through a parallel connecting rod assembly; a vertical return spring sleeved on a connecting screw is arranged between the rear end of a base and the bottom surface of the straight portion, an elastic sheet is disposed between one side of a rear end of the base and one side of a rear end of the straight portion, which are cooperated with a fine-tuning mechanism to realize the adjustment of the pitch angle and the lateral angle of the inner shell assembly.

16 Claims, 6 Drawing Sheets

(51) Int. Cl.
G02B 7/02 (2021.01)
G02B 23/16 (2006.01)

(56) References Cited

U.S. PATENT DOCUMENTS

| | | | |
|---|---|---|---|
| 10,006,741 B2 | 6/2018 | Jeung et al. | |
| 2015/0198421 A1* | 7/2015 | Crispin | F41G 11/006 42/126 |
| 2016/0377378 A1* | 12/2016 | Collin | G02B 23/10 42/113 |
| 2018/0128574 A1 | 5/2018 | Crispin | |
| 2019/0041626 A1* | 2/2019 | Derushia | F41G 1/00 |

FOREIGN PATENT DOCUMENTS

| | | |
|---|---|---|
| CN | 208720908 U | 4/2019 |
| CN | 208720909 U | 4/2019 |
| JP | 2015-191239 A | 11/2015 |
| WO | WO 2016/210068 A1 | 12/2016 |
| WO | WO 2019/068165 A1 | 4/2019 |

OTHER PUBLICATIONS

Extended European Search Report dated Apr. 19, 2023, in connection with European Application No. 19958433.5.
International Search Report mailed Aug. 13, 2020 in connection with International Application No. PCT/CN2019/130841.

* cited by examiner

OPEN TYPE FINE-TUNING SIGHT

CROSS REFERENCE TO RELATED APPLICATIONS

The present application is a national stage filing under 35 U.S.C. § 371 of International PCT Application No. PCT/CN2019/130841, filed on Dec. 31, 2019, the entire contents of which are incorporated herein by reference.

TECHNICAL FIELD

The present disclosure relates to an open type fine-tuning sight.

BACKGROUND

In the related art, sights are generally only used for assisting in the shooting process of firearms, and are generally suitable for a certain type of firearms, when changing firearms, it is necessary to re-calibrate the sights. At the same time, there are corresponding requirements for different shooting distances and corresponding ballistics, the shooting angle of the inner red dot aiming point needs to be adjusted. In the existing open type sights, the bearing part of the red dot module is exposed above the bracket and is not protected as necessary. After a collision, the structure of the bearing part is more or less damaged, thereby affecting the aiming accuracy.

SUMMARY

To achieve the above purpose, the present disclosure provides an open fine-tuning sight, including: a housing provided with a straight portion and a lens mounting frame provided at a front end of the straight portion, wherein the housing comprises an outer housing assembly and an inner housing assembly sleeved in the outer housing assembly;
  the inner housing assembly is sleeved in an installation space at a front end of the outer housing assembly, and a front end of the inner housing assembly is connected to the front end of the outer housing assembly through a connecting rod assembly comprising two connecting rod groups that passes through transversely;
  the inner housing assembly comprises a base and an arc-shaped lens mounting frame of which both ends spanned at left and right sides of a front end of the base;
  the arc-shaped lens mounting frame is arranged in the lens mounting frame and is in clearance fit with the lens mounting frame;
  the front end of the base is provided with two arc-shaped convex surfaces with arc-shaped end surfaces below inner connecting rod perforations through which the connecting rod groups of the connecting rod assembly passes, the two arc-shaped convex surfaces are respectively disposed on left and right sides of an axial direction of the base; inner sides of left and right ends of a bottom surface of the front end of the straight portion corresponding to the two arc-shaped convex surfaces are each provided with an arc-shaped concave surface to match with the arc-shaped convex surfaces;
  the left and right sides of the bottom surface of the front end of the straight portion are provided with outer connecting rod perforations corresponding to the inner connecting rod perforations and coaxial with the inner connecting rod perforations above the arc-shaped concave surface;
  an end portion of the front end of the base is an arc-shaped protruding surface protruding outward, and the arc-shaped protruding surface is arranged in an arc-shaped inner concave surface of the bottom surface of the front end of the straight portion;
  an elastic piece is provided between one side of a rear end of the base and an opposite side of the rear end of the straight portion, the elastic piece is configured to cooperate with a fine-tuning mechanism that passes through the other side of the rear end of the straight portion from an outside to an inside and is installed in the rear end of the base to adjust a lateral angle of the inner housing assembly;
  a vertical return spring sleeved on a connecting screw is provided between the rear end of the base and the bottom surface of the straight portion to cooperate with the fine-tuning mechanism to adjust a pitch angle of the inner housing assembly;
  the connecting screw is threadedly connected with a bottom surface of the base and being penetrated upward from the bottom surface of the straight portion.

According to exemplary embodiments of the present disclosure, the fine-tuning mechanism comprises a base inclined surface at a rear side of the LED bracket arranged at the rear end of the base and a slider of which one end is provided with a slider inclined surface parallel to and opposite to the base inclined surface, a coil spring arranged in a cavity at the other end of the slider, an up and down adjusting screw and a left and right adjusting screw respectively passing through the rear end of the straight portion and connected to the rear end of the base through threads;
  the up and down adjusting screw is connected with an up and down nut provided on the base, and the up and down nut abuts on a left side of the cavity;
  the left and right adjusting screw is connected to a left and right nut provided on the base, and the left and right nut abuts on a rearwardly extending plane on a rear side of the LED bracket, and a plane is arranged opposite to the base inclined surface.

According to exemplary embodiments of the present disclosure, the straight portion is provided with a spring thimble mechanism on the rear side of the base, the spring thimble mechanism comprises an L-shaped thimble seat, a thimble sleeve, a thimble spring and a thimble;
  the thimble is inserted into the thimble spring, the thimble spring is inserted into the thimble sleeve and extends back to a blind hole in protruding portion of a front end of the thimble seat, and the thimble sleeve is installed in the blind hole;
  there are two spring thimble mechanisms, which are respectively arranged on the left and right sides of the straight portion;
  a tapered surface of the thimble is extended to an outside of the thimble sleeve and is abutted on an annular gear portion on a peripheral wall of the left adjusting screw or the right adjusting screw.

According to exemplary embodiments of the present disclosure, the rear end of the straight portion is provided with a solar panel module.
  the rear end of the base is provided with an arc-shaped protrusion surface at a position opposite to the arc-shaped convex surface, the arc-shaped protrusion surface and the arc-shaped convex surface are provided with concentric arcs.

According to exemplary embodiments of the present disclosure, a vertical return spring sleeved on a connecting screw is provided between the rear end of the base and the bottom surface of the straight portion to cooperate with the fine-tuning mechanism to adjust the pitch angle of the inner housing assembly.

According to exemplary embodiments of the present disclosure, an elastic piece is provided between one side of the rear end of the base.

According to exemplary embodiments of the present disclosure, the front end of the base is provided with two parallel perforations for passing through steel shafts of the connecting rod groups; and the parallel perforations are inclined to a side close to the elastic piece, an inclination angle value of the perforation is in a range of 2°~5°.

According to exemplary embodiments of the present disclosure, the inclination angle value is 3°.

The disclosure will be described in detail below in conjunction with the drawings and embodiments.

DETAILED DESCRIPTION

Figure 1:
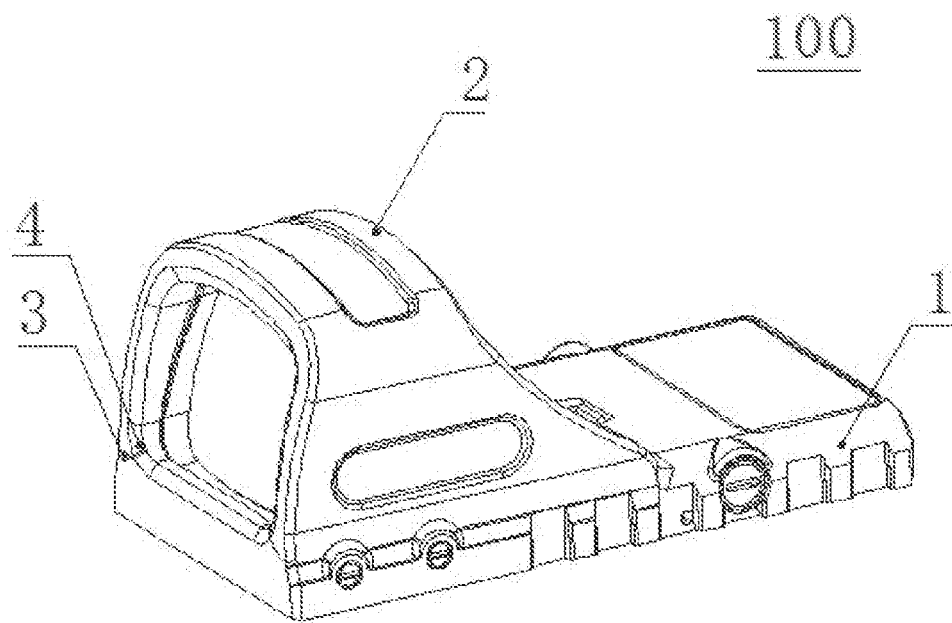
FIG. 1 is a perspective view of an open type fine-tuning sight.
Figure 2:
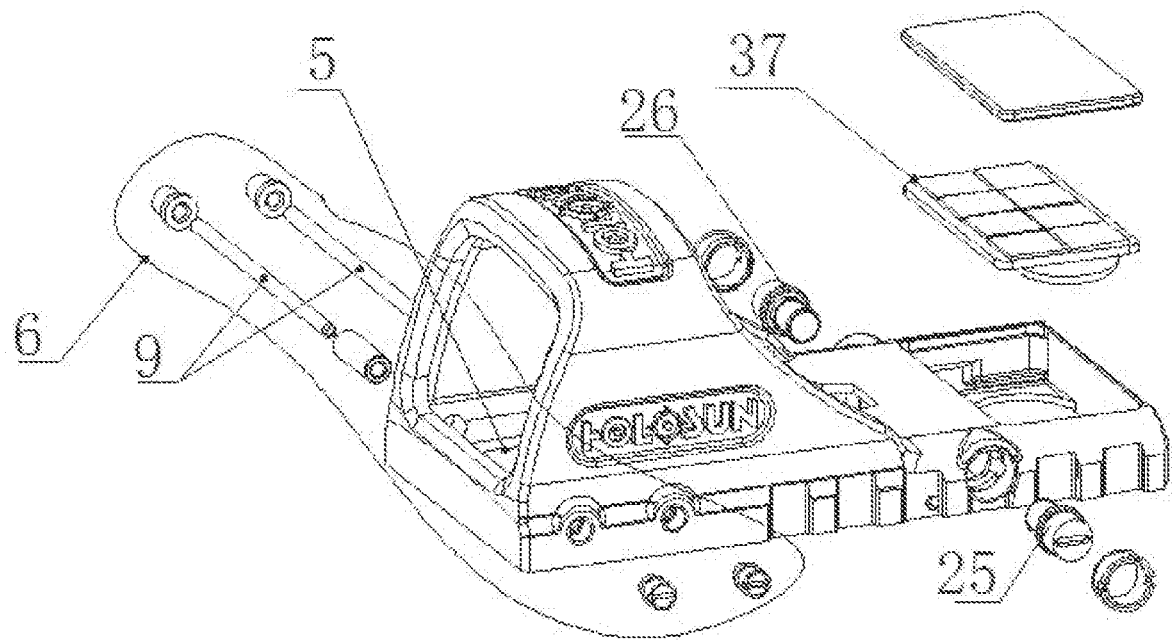
FIG. 2 is a partial exploded view of an open type fine-tuning sight.
Figure 11:
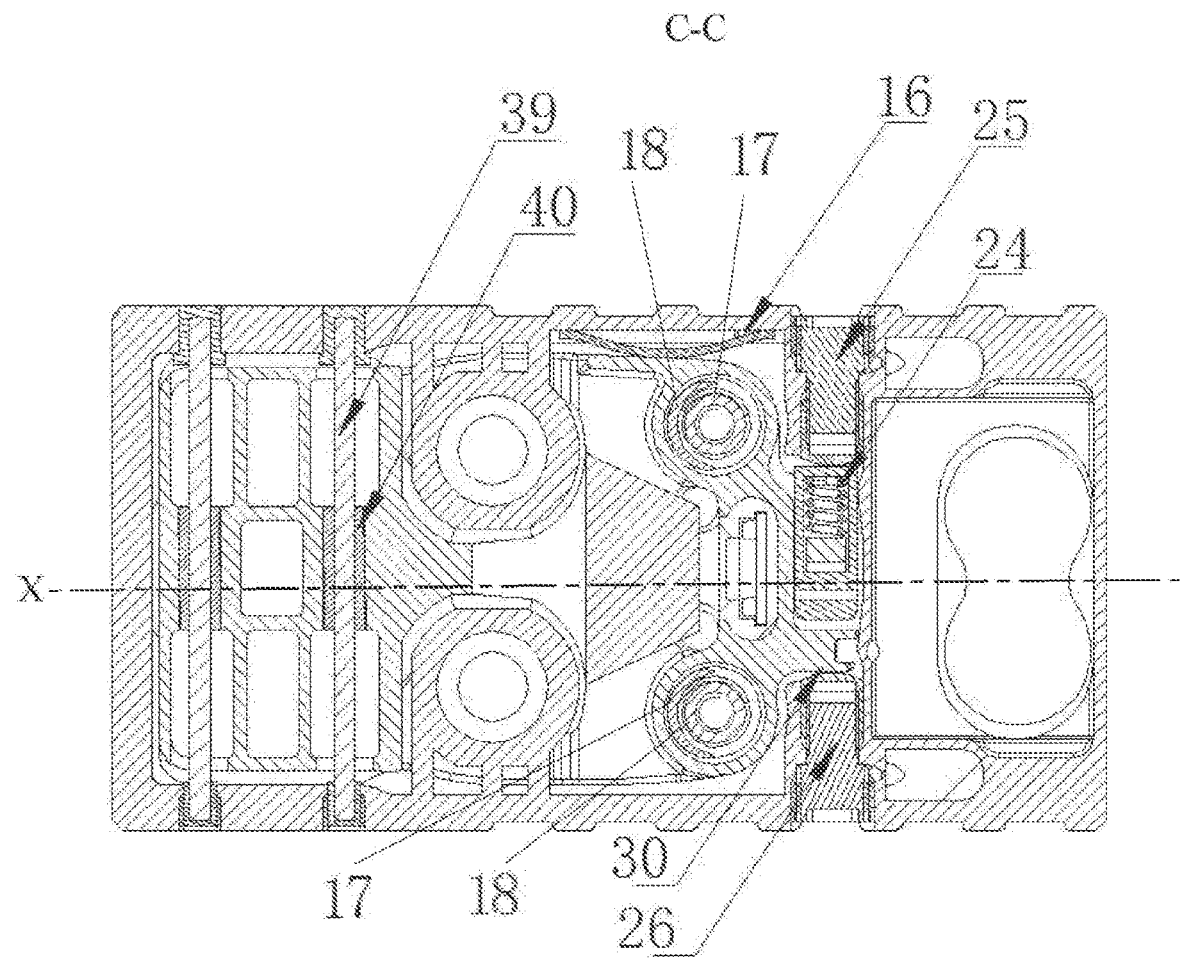
FIG. 11 is a cross-sectional view taken along the line C-C in FIG. 7.

In order to provide a fine tuning and accurate sight that can meet the needs of various ballistic shooting and has a good protective effect, this embodiment provides an open type fine-tuning sight as shown in FIGS. 1 and 2, which includes a housing 100 mainly provided with a straight portion 1 shown in FIG. 1 and a lens mounting frame 2 provided at the front end of the straight portion 1, the special feature is that the housing 100 includes an outer housing assembly 3 and an inner housing assembly 4 sleeved in the outer housing assembly 3. Where, the inner housing assembly 4 is sleeved in the installation space 5 at the front end of the outer housing assembly 3 shown in FIG. 2, moreover, the front end of the inner housing assembly 4 is connected to the front end of the outer housing assembly 3 through a connecting rod assembly 6 which includes two connecting rod groups 9, so that the necessary physical foundation for the dynamic adjustment of the inner housing assembly 4 relative to the outer housing assembly 3 is created. As shown in FIG. 11, the connecting rod groups 9 include two steel shafts 39, that is, one connecting rod group 9 includes one steel shaft 39.

Figures 3, 4, 5:
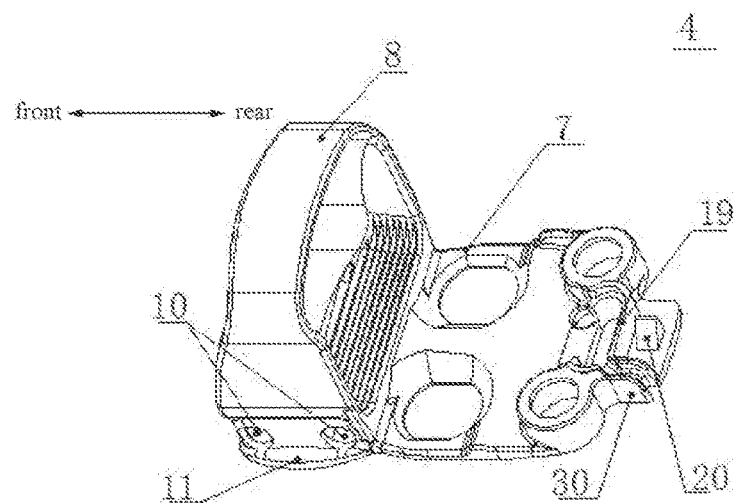
FIG. 3 is a schematic diagram of the inner housing assembly.
FIG. 4 is a schematic view of the bottom of the straight portion in the outer housing assembly.
FIG. 5 is a side view of the inner housing assembly.

The inner housing assembly 4 includes a base 7 shown in FIG. 3 and an arc-shaped lens mounting frame 8 of which the both ends spanned at the left and right sides of the front end of the base 7. And the arc-shaped lens mounting frame 8 is arranged in the lens mounting frame 2 of the outer housing assembly 3 and is in clearance fit with the lens mounting frame 2, which facilitates the relative dynamic rotation between the inner housing assembly 4 and the outer housing assembly 3, and facilitates the adjustment of the pitch angle or the horizontal swing angle of the inner housing assembly 4.

It can be seen from FIG. 3 and FIG. 4 that, in order to facilitate the installation of the inner housing assembly 4, the front end of the base 7 of this embodiment is provided with an arc-shaped convex surface 11 with an arc-shaped end surface below the inner connecting rod perforations 10, the arc-shaped convex surface 11 is fitted in the arc-shaped concave surfaces 12 provided on the left and right sides of the bottom surface of the front end of the straight portion 1; where, the inner connecting rod perforation 10 is a hole for the connecting rod group 9 in the connecting rod assembly 6 to pass through.

Figure 6:
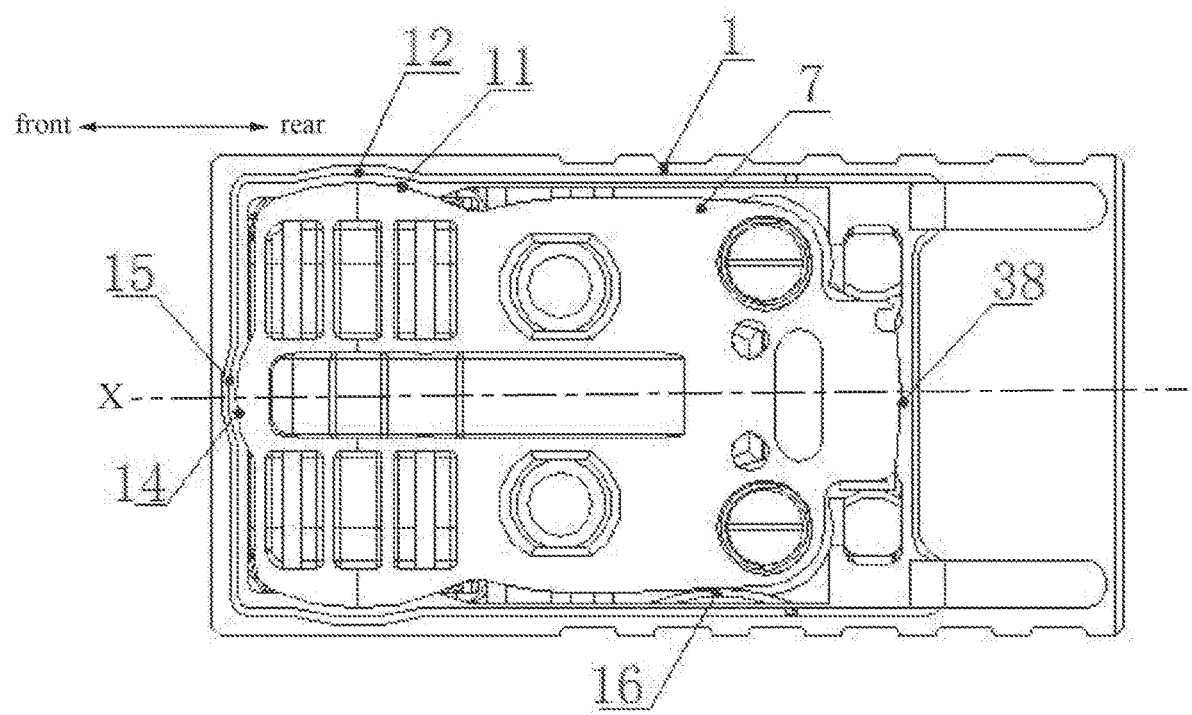
FIG. 6 is a schematic diagram of the bottom structure of an open type fine-tuning sight with the bottom cover removed.

The positions located at the left and right sides of the bottom surface of the front end of the straight portion 1 and located above the arc-shaped concave surface 12 are provided with outer connecting rod perforations 13 corresponding to and coaxial with the inner connecting rod perforation 10 (see FIG. 4). As shown in FIG. 5 and FIG. 6, the end portion of the front end of the base 7 is an arc-shaped protruding surface 14 protruding outward, and the arc-shaped protruding surface 14 is arranged in the arc-shaped inner concave surface 15 of the bottom surface of the front end of the straight portion 1. Therefore, as shown in FIG. 4, after the arc-shaped lens mounting frame 8 is inserted into the lens mounting frame 2 from the mounting hole 29 at the front end of the straight portion 1, the inner housing assembly 4 is limited, moreover, depending on the concave-convex matching relationships between the arc-shaped protruding surface 14 and the arc-shaped inner concave surface 15 and between the arc-shaped convex surface 11 and the arc-shaped concave surface 12, it is convenient to realize the fine tuning of the inner housing assembly 3.

Among them, as shown in FIG. 6, the arc-shaped protruding surface 14, the arc-shaped protruding surfaces 11 (respectively at the opposite position on the left and right sides of the axis of the base), and the arc-shaped convex surface 38 at the position opposite to the arc-shaped protruding surface 14 at the rear end of the base are concentric arcs, which ensures that the impact force during shooting will not affect the accuracy of the sight. As shown in FIG. 6, an elastic piece 16 is provided between one side of the rear end of the base 7 and one side of the rear end of the straight portion 1, the elastic piece 16 is used to cooperate with a fine-tuning mechanism 200 to adjust the lateral angle of the inner housing assembly 4. Where, the fine-tuning mechanism 200 is passed through the other side of the rear end of the straight portion 1 from the outside to the inside and is installed in the rear end of the base 7 (as shown in FIG. 9 and FIG. 11).

Figure 7:
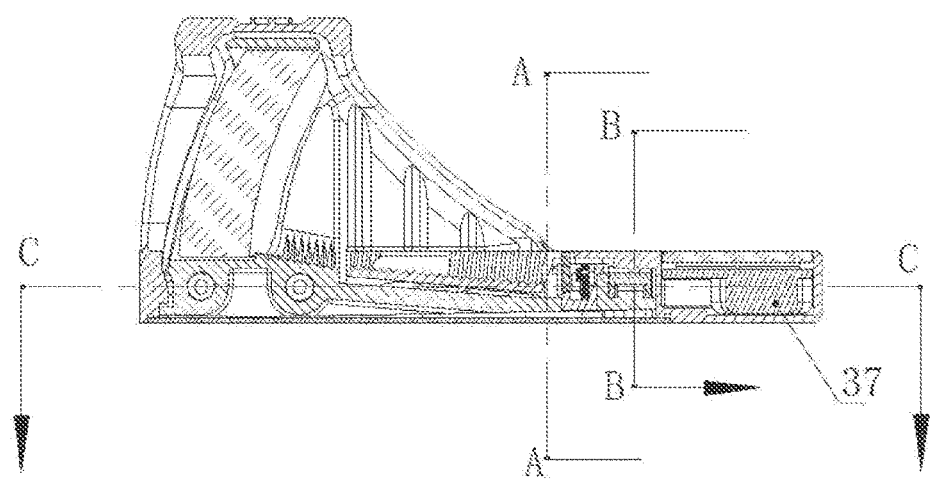
FIG. 7 is an axial cross-sectional view of an open type fine-tuning sight.
Figure 8:
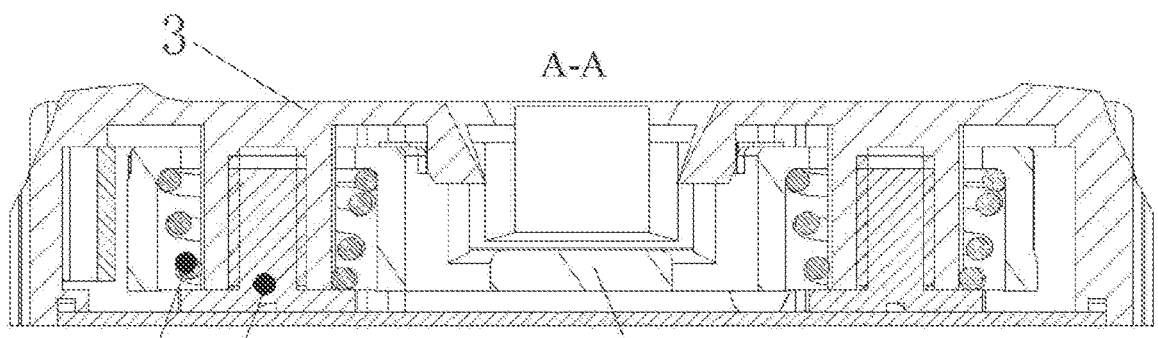
FIG. 8 is a cross-sectional view taken along the line A-A in FIG. 7.

With reference to FIGS. 7 and 8, it can be seen that the sight further includes a connecting screw 17 and a vertical return spring 18. Where, the connecting screw 17 is threadedly connected with a bottom surface of the base 7 after being penetrated upward from the bottom surface of the straight portion 1, the vertical return spring 18 is sleeved on the connecting screw 17, and the vertical return spring 18 is provided between the rear end of the base 7 of the inner housing assembly 4 and the bottom surface of the straight portion 1 to cooperate with the fine-tuning mechanism 200 to adjust the pitch angle of the inner housing assembly 4.

Figure 9:
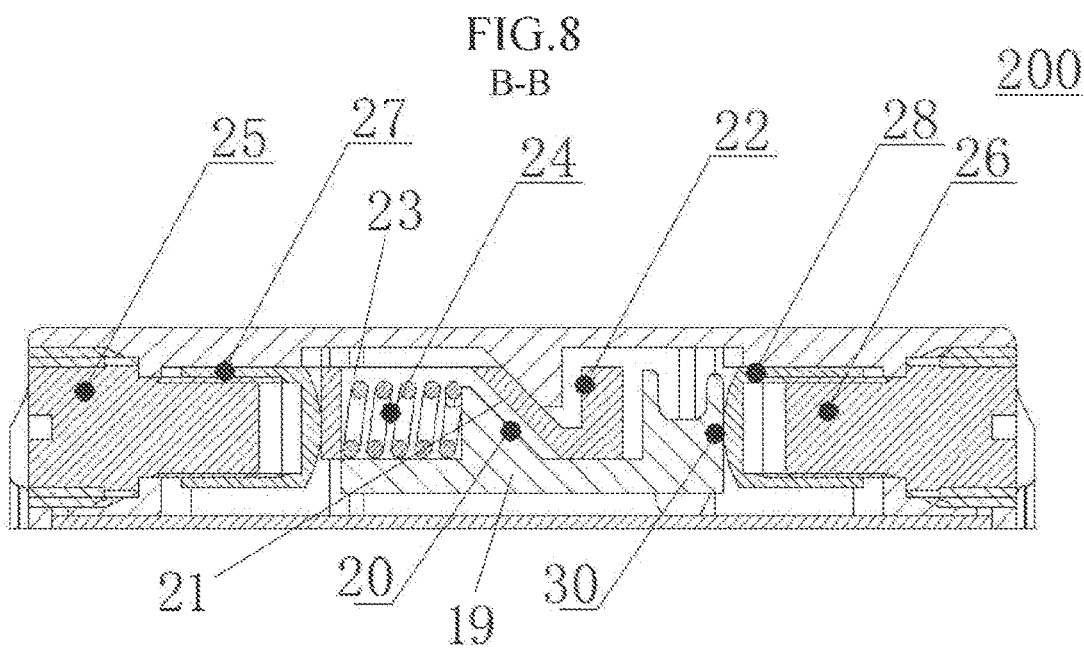
FIG. 9 is a cross-sectional view taken along the line B-B in FIG. 7.
Figure 10:
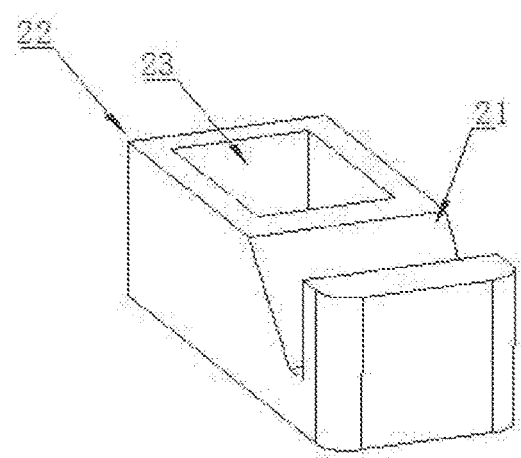
FIG. 10 is a schematic diagram of the structure of the slider.

As shown in FIG. 9, The fine-tuning mechanism 200 includes an LED bracket 19, a slider 22, a coil spring 24, an up and down adjusting screw 25 and a left and right adjusting screw 26. Where, as shown in FIG. 3, the LED bracket 19 is arranged at the rear end of the base 7, the base inclined surface 20 is provided at the rear side of the LED bracket 19. The slider 22 of which one end is provided with a slider inclined surface 21 (see FIG. 10) parallel to and opposite to the base inclined surface 20, the coil spring 24 arranged in the cavity 23 (see FIG. 10) at the other end of the slider 22, the up and down adjusting screw 25 and the left and right adjusting screw 26 respectively passing through the rear end of the straight portion 1 and connected to the rear end of the base 7 through threads. Where, the up and down adjusting screw 25 is connected with an up and down nut 27 provided on the base 7, and the up and down nut 27 abuts on the left side of the cavity 23 shown in FIG. 10 (that is, the left hand side of the viewer). The left and right adjusting screw 26 is connected to the left and right nut 28 provided on the base 7, and the left and right nut 28 abuts on a rearwardly extending plane 30 on the rear side of the LED bracket 19, and the plane 30 is arranged opposite to the base inclined surface 20.

In this way, as shown in FIG. 9, when the up and down adjusting screw 25 is turned, the slider 22 is pushed to the right through the up and down nut 27, and the slider inclined surface 21 and the base inclined surface 20 are abutted against with each other, and the slider inclined surface 21 slides down relatively, and the stress point is located at the tail of the inner housing assembly 4, that is, the rear end of the base 7, so as to realize the downward fine tuning and rightward fine tuning of the inner housing assembly 4 to compress the elastic piece 16 and the vertical return spring 18. As shown in FIG. 9, when the up and down adjusting screw 25 is rotated in the reverse direction, since the base 7 is relatively fixed, the coil spring 24 in the cavity 23 at the other end of the slider 22 (see FIG. 10) has been squeezed between the left side wall of the cavity 23 and the vertical surface located on the left side of the base inclined surface 20 as shown in FIG. 9, and the rightward pressure of the up and down adjusting screw 25 received at this time is weakened with the reverse rotation of the up and down adjusting screw 25, then the coil spring 24 returns to the initial state, pushes the slider 22 to the left to move, the slider inclined surface 21 pushes the base inclined surface 20 to the left, and the slider inclined surface 21 moves upward, and the downward pressure of the slider 22 on the rear end of the base 7 is removed, at the same time, under the reverse force of the vertical return spring 18, the tail of the inner housing assembly 4, that is, the rear end of the base 7 is fine-tuned upwards and there is no gap backlash which is mainly caused by the retention of the reverse force of the elastic piece 16.

Rotate the left and right adjusting screw 26, see FIG. 9, the left and right nut 28 is directly stressed on the plane 30, at the same time, under the reaction of the elastic piece 16 and the vertical return spring 18 shown in FIG. 11, the tail of the inner housing assembly 4, that is, the base 7 is moved to the right (when the viewer looks at FIG. 9, the viewer's right hand side is to the right) to fine-tune and lift.

It can be seen from FIG. 11 that, in order to maintain the stability of the dynamic adjustment of the inner housing assembly 4 relative to the outer housing assembly 3, two perforations 40 corresponding to the connecting rod group 9 are opened at the front end of the base 7 of the inner housing assembly 4. The connecting rod group 9 includes two parallel elastic steel shafts 39. The perforation 40 is intentionally inclined at an angle to the upper right of FIG. 11 during processing, and the angle value is 2°~5° (that is, the perforation 40 is inclined from bottom to top to the right, and the inclination angle has an angle value of) 2°~5°. After the test of this embodiment, the value of the inclination angle is 3°, so as to ensure sufficient clamping force. Relying on the elastic deformation of the elastic steel shaft 39, the inner housing assembly 4 has a certain pre-tightening force after assembly, ensuring the stability of the dynamic adjustment of the inner housing assembly 4 relative to the outer housing assembly 3. At the same time, on one side of the rear end of the base 7, that is, on the side above the rear end of the base 7 shown in FIG. 11 is provided with an elastic piece 16 and two upper and lower return springs, namely the vertical return springs 18 shown in FIG. 8, which play the role of eliminating the gap for the auxiliary rebound mechanism and improving the shooting stability.

Figure 12:
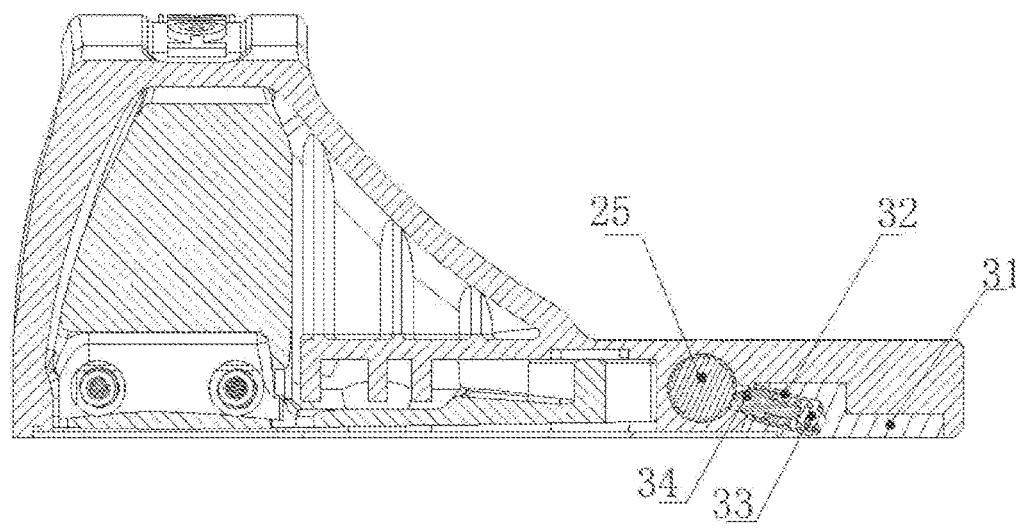
FIG. 12 is a schematic diagram of the installation of the spring thimble mechanism.
Figure 13:
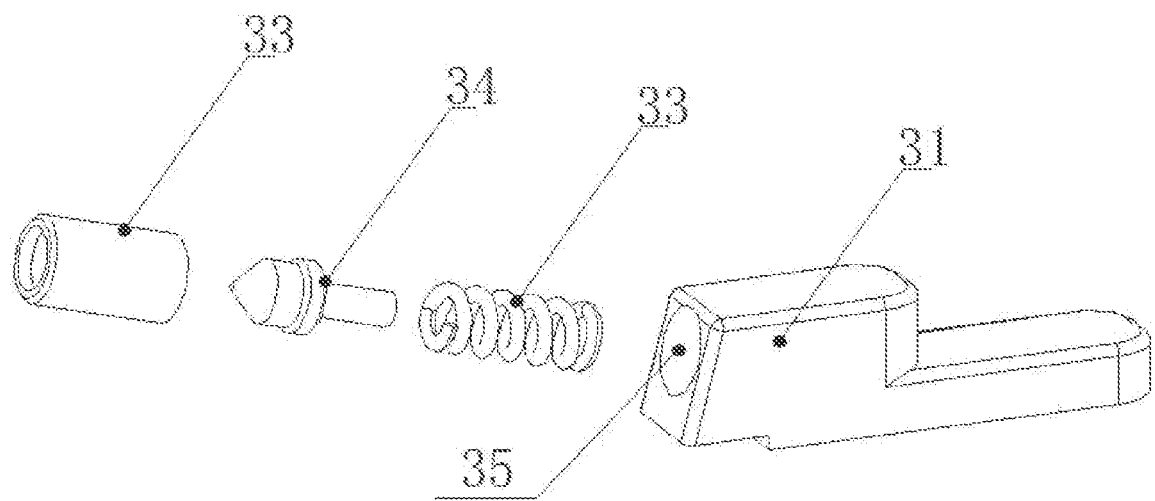
FIG. 13 is an exploded view of the spring thimble mechanism.
Figure 14:
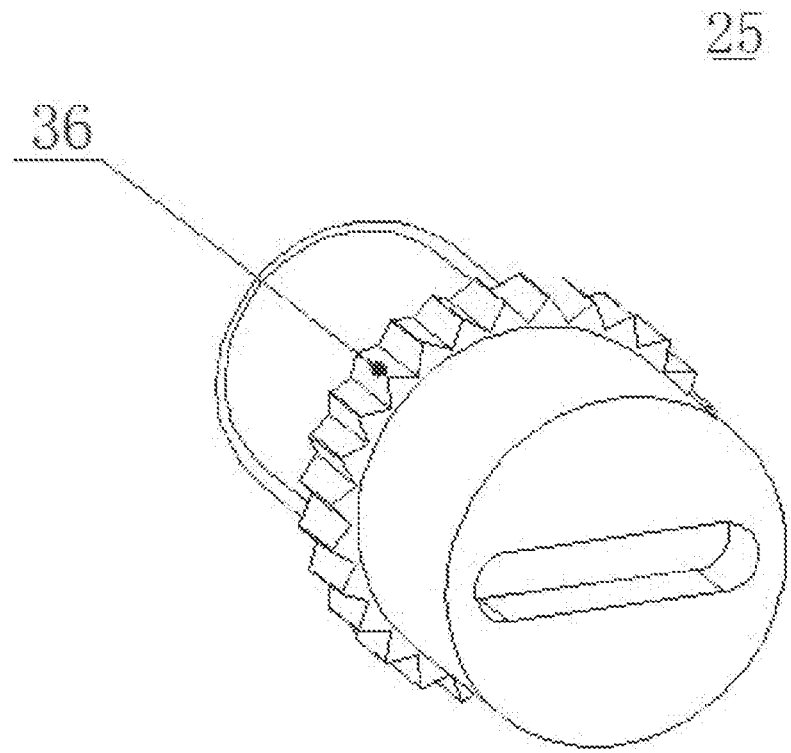
FIG. 14 is a schematic diagram of a left adjusting screw or a right adjusting screw provided with an annular gear portion circumferentially.

In order to facilitate the operator to clearly perceive and know the pitch of rotation or fine-tuning during the fine tuning process, the straight portion 1 of this embodiment is provided with a spring thimble mechanism 300 shown in FIGS. 12 and 13 on the rear side of the base 7, the spring thimble mechanism 300 includes an L-shaped thimble seat 31, a thimble sleeve 32, a thimble spring 33 and a thimble 34, where, the thimble 34 is inserted into the thimble spring 33, the thimble spring 33 is inserted into the thimble sleeve 32 and extends back to the blind hole 35 in protruding portion of the front end of the thimble seat 31, and the thimble sleeve 32 is installed in the blind hole 35; there are two spring thimble mechanisms 300, which are respectively arranged on the left and right sides of the straight portion 1; the tapered surface of the thimble 34 extends to the outside of the thimble sleeve 32 and abuts on the annular gear portion 36 on the peripheral wall of the left adjusting screw 25 or the right adjusting screw 26 (see FIG. 14).

Where, the number of teeth on the annular gear is 27, 28 or 29, in one embodiment, the number is 28, and the corresponding fine adjustment accuracy is not greater than 1.2 MOA (Minute of Angle), according to a grid of 1.1 MOA, a pitch of 0.25 mm, and a center distance of 27.2 mm in the length direction of the sight, the number of teeth in this embodiment is 28. In this way, the number of teeth to be rotated can be determined according to the number of sounds made during rotation, and the angle value of the fine adjustment can be known according to the pitch.

The rear end of the straight portion 1 is provided with a solar panel module 37, which is a general technology and will not be described here.

What is claimed is:

1. An open type fine-tuning sight, comprising a housing provided with a straight portion and a lens mounting frame provided at a front end of the straight portion, wherein the housing comprises an outer housing assembly and an inner housing assembly sleeved in the outer housing assembly;

the inner housing assembly is sleeved in an installation space at a front end of the outer housing assembly, and a front end of the inner housing assembly is connected to the front end of the outer housing assembly through a connecting rod assembly, the connecting rod assembly comprising two connecting rod groups, and the two connecting rod groups passing through the inner housing assembly and the outer housing assembly along a direction perpendicular to an axial direction of a base;

the inner housing assembly comprises the base and an arc-shaped lens mounting frame of which both ends spanned at left and right sides of a front end of the base;

the arc-shaped lens mounting frame is arranged in the lens mounting frame and is in clearance fit with the lens mounting frame;

the front end of the base is provided with two arc-shaped convex surfaces with arc-shaped end surfaces below inner connecting rod perforations through which the connecting rod groups of the connecting rod assembly passes, the two arc-shaped convex surfaces are respectively disposed on left and right sides of the axial direction of the base; inner sides of left and right ends of a bottom surface of the front end of the straight portion corresponding to the two arc-shaped convex surfaces are each provided with an arc-shaped concave surface to match with the arc-shaped convex surfaces; the left and right sides of the bottom surface of the front end of the straight portion are provided with outer connecting rod perforations corresponding to the inner connecting rod perforations and coaxial with the inner connecting rod perforations above the arc-shaped concave surface;

an end portion of the front end of the base is an arc-shaped protruding surface protruding outward, and the arc-shaped protruding surface is arranged in an arc-shaped inner concave surface of the bottom surface of the front end of the straight portion;

an elastic piece is provided between one side of a rear end of the base and an opposite side of the rear end of the straight portion, the elastic piece is configured to cooperate with a fine-tuning mechanism that passes through the other side of the rear end of the straight portion from an outside to an inside and is installed in the rear end of the base to adjust a lateral angle of the inner housing assembly;

a vertical return spring sleeved on a connecting screw is provided between the rear end of the base and the bottom surface of the straight portion to cooperate with the fine-tuning mechanism to adjust a pitch angle of the inner housing assembly;

the connecting screw is threadedly connected with a bottom surface of the base and being penetrated upward from the bottom surface of the straight portion.

2. The open type fine-tuning sight according to the claim 1, wherein the fine-tuning mechanism comprises a base inclined surface at a rear side of the LED bracket arranged at the rear end of the base and a slider of which one end is provided with a slider inclined surface parallel to and opposite to the base inclined surface, a coil spring arranged in a cavity at the other end of the slider, an up and down adjusting screw and a left and right adjusting screw respectively passing through the rear end of the straight portion and connected to the rear end of the base through threads;

the up and down adjusting screw is connected with an up and down nut provided on the base, and the up and down nut abuts on a left side of the cavity;

the left and right adjusting screw is connected to a left and right nut provided on the base, and the left and right nut abuts on a rearwardly extending plane on a rear side of the LED bracket, and a plane is arranged opposite to the base inclined surface.

3. The open type fine-tuning sight according to the claim 2, wherein the straight portion is provided with a spring thimble mechanism on the rear side of the base, the spring thimble mechanism comprises an L-shaped thimble seat, a thimble sleeve, a thimble spring and a thimble;

the thimble is inserted into the thimble spring, the thimble spring is inserted into the thimble sleeve and extends back to a blind hole in protruding portion of a front end of the thimble seat, and the thimble sleeve is installed in the blind hole;

there are two spring thimble mechanisms, which are respectively arranged on the left and right sides of the straight portion;

a tapered surface of the thimble (34) is extended to an outside of the thimble sleeve and is abutted on an annular gear portion on a peripheral wall of the up and down adjusting screw or the left and right adjusting screw.

4. The open type fine-tuning sight according to the claim 1, wherein the rear end of the straight portion is provided with a solar panel module.

5. The open type fine-tuning sight according to the claim 1, wherein the rear end of the base is provided with an arc-shaped protrusion surface at a position opposite to the arc-shaped convex surface, the arc-shaped protrusion surface and the arc-shaped convex surface (14) are provided with concentric arcs.

6. The open type fine-tuning sight according to the claim 2, wherein a vertical return spring sleeved on a connecting screw is provided between the rear end of the base and the bottom surface of the straight portion to cooperate with the fine-tuning mechanism to adjust the pitch angle of the inner housing assembly.

7. The open type fine-tuning sight according to the claim 2, wherein an elastic piece is provided between one side of the rear end of the base.

8. The open type fine-tuning sight according to the claim 1, wherein the front end of the base is provided with two parallel perforations for passing through steel shafts of the connecting rod groups; and the parallel perforations are inclined to a side close to the elastic piece, an inclination angle value of the perforation is in a range of 2°~5°.

9. The open type fine-tuning sight according to the claim 8, wherein the inclination angle value is 3°.

10. The open type fine-tuning sight according to the claim 2, wherein the rear end of the straight portion is provided with a solar panel module.

11. The open type fine-tuning sight according to the claim 3, wherein the rear end of the straight portion is provided with a solar panel module.

12. The open type fine-tuning sight according to the claim 2, wherein the rear end of the base is provided with an arc-shaped protrusion surface at a position opposite to the arc-shaped convex surface, the arc-shaped protrusion surface and the arc-shaped convex surface are provided with concentric arcs.

13. The open type fine-tuning sight according to the claim 6, wherein an elastic piece (16) is provided between one side of the rear end of the base.

14. The open type fine-tuning sight according to the claim 2, wherein the front end of the base is provided with two parallel perforations for passing through steel shafts of the connecting rod groups; and the parallel perforations are inclined to a side close to the elastic piece, an inclination angle value of the perforation is in a range of 2°~5°.

15. The open type fine-tuning sight according to the claim 3, wherein the front end of the base is provided with two parallel perforations for passing through steel shafts of the connecting rod groups; and the parallel perforations are inclined to a side close to the elastic piece, an inclination angle value of the perforation is in a range of 2°~5°.

16. The open type fine-tuning sight according to the claim 6, wherein the front end of the base is provided with two parallel perforations for passing through steel shafts of the connecting rod groups; and the parallel perforations are inclined to a side close to the elastic piece, an inclination angle value of the perforation is in a range of 2°~5°.

* * * * *